United States Patent [19]

Austin

[11] Patent Number: 5,281,681
[45] Date of Patent: Jan. 25, 1994

[54] PHOTODEGRADABLE AND BIODEGRADABLE POLYETHYLENE

[75] Inventor: Richard G. Austin, Kingwood, Tex.

[73] Assignee: Exxon Chemical Patents Inc., Linden, N.J.

[21] Appl. No.: 781,516

[22] Filed: Oct. 22, 1991

Related U.S. Application Data

[63] Continuation-in-part of Ser. No. 633,352, Dec. 27, 1990, abandoned.

[51] Int. Cl.$^5$ .............................................. C08F 24/00
[52] U.S. Cl. .................................... 526/266; 528/392
[58] Field of Search ........................ 526/266; 528/392

[56] References Cited

U.S. PATENT DOCUMENTS 4,929,711  5/1990  Chang et al. .................... 528/392
4,957,997  9/1990  Chang et al. .................... 528/392

OTHER PUBLICATIONS

ACS Symposium Series 433, Ch. 13, 1990, W. J. Bailey, et al. "Agricultural & Synthetic Polymers" pp. 149–160.
ACS Symposium Series 280 Ch 29, 1985 W. J. Bailey et al. "Synthesis of Biodegradable Polyethylene", pp. 423–431.
Polymer Preprints, vol. 25, 1984, W. J. Bailey, et al. "Synthesis of Biodegradable Polyethylene" pp. 58–59.
Annals of the New York Academy of Sciences, vol. 446, 1985, Bailey et al. "Macromolecules as drugs & carriers . . ." pp. 41–50.
Dissertation Abstracts International, vol. 43 No. 6, Dec. 1982, B. D. Gapud "The Synthesis of Biodegradable Crosslinked . . ." pp. 41–50.
Chemical Abstracts vol. 99, No. 4 Jul. 25, 1983, p. 14 Abstract #23128f.

*Primary Examiner*—Harold D. Anderson
*Attorney, Agent, or Firm*—Catherine L. Bell; Myron B. Kurtzman

[57] ABSTRACT

Ethylene, 2-methylene-1,3-dioxepane, and optionally carbon monoxide are reacted in the presence of free radical catalyst to form a biodegradable and optionally photodegradable polymer represented by the formulae:

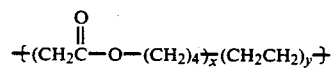

where x and y are integers or

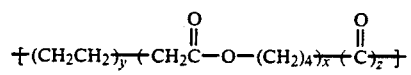

where x, y and z are integers.

7 Claims, No Drawings

PHOTODEGRADABLE AND BIODEGRADABLE POLYETHYLENE

This invention is a continuation-in-part of earlier filed U.S. Ser. No. 633,352, filed Dec. 27, 1990, now abandoned.

BACKGROUND OF THE INVENTION

Environmental degradation of synthetic polymers occurs at varying rates and to varying degrees depending on the polymer and its environment. Such degradations are catalyzed by light, heat, air, water, microorganisms, and from mechanical forces such as wind, rain, vehicular traffic, etc. Enhancing the stability and/or the degradability of polymers is generally accomplished by additives, changing the polymer backbone, introduction of functional groups, or by blending with appropriate fillers. However, many of these techniques for reducing degradation also result in detrimental properties in the polymer produced.

SUMMARY OF THE INVENTION

Therefore, it is an object of the present invention to provide a process which produces in high yield a copolymer having good biodegradability, and a high yield terpolymer having good biodegradability and photodegradability.

The present invention provides a process for making a biodegradable copolymer by polymerizing a reaction mixture of ethylene and 2-methylene-1,3-dioxipane. The reaction mixture can be heated to a temperature of about 150° to 260° C. at a pressure of between 350 and 3500 kg/cm² in the presence of an initiator, thereby reacting the ethylene with the 2-methylene-1,3-dioxepane to form a biodegradable polymer represented by the formula

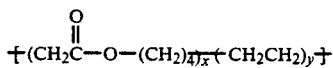

where x and y are integers, and having a molecular weight of at least about 7,000. All molecular weights are weight average molecular weight unless otherwise noted.

The present invention also provides a process for making a terpolymer of ethylene and 2-methylene-1,3-dioxepane with carbon monoxide which in addition to biodegradability has good photodegradability characteristics. The terpolymer is represented by the general formula

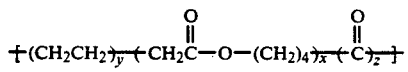

where x, y and z are integers, and where the ethyl, ester and keto groups are randomly or uniformly distributed in the terpolymer along the backbone of the terpolymer, according to the varying concentrations of the groups. The terpolymer has a molecular weight of at least about 7,000.

DETAILED DESCRIPTION OF THE INVENTION

In the present invention, a polymer is produced having ester groups inserted into its polyethylene backbone. These ester groups increase the biodegradability of the polymer, by allowing for the breakdown of the polymer at the ester groups. After the polymer has been sufficiently broken down, it can be assimilated by microorganisms.

In producing the copolymer of the present invention, ethylene and 2-methylene-1,3- dioxepane (MDOP) are reacted according to the following equation:

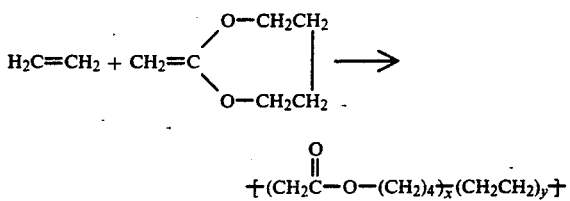

where x and y are integers. The copolymer so produced has a molecular weight greater 7,000, preferably, greater than 20,000 and most preferably, greater than 50,000. The mole percentage of ester groups in the copolymers of the invention generally varies between about 0.05% and 20 mole % with a preferred range of 2 to 15 mole %; and a most preferred percentage of 6 to 10 mole %.

The terpolymer is produced by additionally reacting carbon monoxide with ethylene and MDOP according to the following equation:

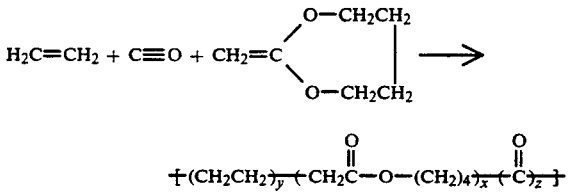

where x, y and z are integers. The terpolymer exhibits better photodegradability than the copolymer, because the additional carbonyl groups in the polymer cleave upon absorbing light such as sunlight or UV light. The terpolymer can be both photodegradable and biodegradable because both the ester and the carbonyl functionalize. This is a particularly desirable combination in many applications for the terpolymer. The terpolymer so produced has a molecular weight greater 7,000, preferably, greater than 20,000 and most preferably, greater than 50,000. The mole percentage of ester groups in the terpolymers of the invention generally varies between 0.05% and 20% with a preferred range of 2 mole % to 15 mole % and a most preferred range of 6 to 10%. The mole percentage of carbonyl groups in the terpolymer of the invention generally varies between about 0.1% and 20%, with a preferred range of about 5 to 10 wt. % and a most preferred range of about 0.9 to 5 wt. %.

The copolymer of the invention is conveniently prepared by a high pressure polymerization process in which ethylene and an appropriate amount of MDOP as determined by the product desired are polymerized at a temperature of about 150° to 260° C. and at a pressure of 350 to 3500 kg/cm², preferably about 1700 to 2500 kg/cm². The terpolymer of the invention is prepared using similar conditions with the addition of carbon monoxide to the mixture. The polymerization may be effected in a convenient autoclave or tubular reactor.

Optionally, a chain transfer agent or modifier may be introduced into the reaction vessel to adjust the melt index of the product. The amount of chain transfer agent used therefore depends on the agent chosen and the final melt index sought, as well as the reaction conditions employed. Typically the amount of chain transfer agent will be from 0 to 25% of the reactor feed. The use of chain transfer agents is well known and given the requirements specified herein for the melt index of the polymer it is believed to be within the competence of one skilled in the art to determine a suitable agent and rate of addition empirically. By way of illustration it may be said that suitable agents include those with $C_s$ (chain transfer constant) values (measured at 1360 atmospheres and 130° C. for homopolymerization of ethylene) of up to 1.0 and include hydrogen, acetone, butyraldehyde, cyclohexanone, 1-butene, propionaldehyde, propylene, butane and isobutylene. $C_s$ values of up to 0.3 are preferred. It has been found that propionaldehyde is a convenient chain transfer agent, and that propionaldehyde at 200 ppm was very convenient.

It is to be noted that in some instances there will be incorporation of the chain transfer agent into the copolymer or terpolymer. For example, when isobutylene is employed the product can be effectively an ethylene/MDOP/isobutylene terpolymer. As used herein, the term "copolymer" includes polymers containing such additional comonomers. In the case of the terpolymer containing carbon monoxide, the incorporation can produce an ethylene/CO/MDOP isobutylene tetrapolymer. As used herein, the term "terpolymer" includes polymers containing such additional comonomers.

The polymerization will usually be initiated by a free radical catalyst such as a peroxide. Also, conventional additives such as antioxidants and carriers for the catalyst may be present according to conventional practice.

In general, the copolymer and terpolymer of this invention can be used in any application where low density polyethylene is used. Among the many uses, a few are listed below for illustration:

For example, the polymers of this invention can be melt blown (bottles, etc.), and spun bonded (fibers, fabric, ropes, twines, cords, etc.) made into non-wovens (diaper lining, disposable clothes, etc.) and made into films, garbage bags, strapping materials and molded parts.

The invention will now be described in more detail by way of the following examples.

EXAMPLES 1-16

Ethylene was introduced at 45 kg/cm$^2$ into a compressor where it was compressed to about 150 kg/cm$^2$, then MDOP and chain transfer agent were added and the combined feed was further compressed to approximately 2000 kg/cm$^2$ The various amounts of MDOP are listed in Table I. The high pressure feed was then introduced into an autoclave fitted with a stirrer. 200 ppm of propionaldehyde, a free radical catalyst, were introduced into the autoclave. The autoclave was heated to maintain the desired reaction temperature of between 180 to 230° C.

The formed copolymer, together with unreacted material and impurities were taken via a line to a high pressure separator. Unreacted monomer from the separator was recycled via a heat exchanger to a small compressor. Impurities were separated off in a purge. The data for 16 runs of this process made at various temperatures, ethylene weight percents, MDOP weight percent, initiator conditions are shown in Table 1.

In all of the runs the pressure is 2007 kg/cm$^2$, the run time is 40 seconds, and the initiator was t-butyl peroxypivalate present at a concentration of 150 to 200 ppm.

Runs 13, 14 and 16 had initiator present at 150 ppm. All other runs had initiator present at 200 ppm.

The resulting polymer was then analyzed. Those data are present in Table 1 below.

TABLE 1

| Run | Molecular Weight | Mole % Ester in Product | Wt. % Dioxepane (MDOP) in Feed | Temp., °C. | Wt. % Ethylene in Feed |
|---|---|---|---|---|---|
| 1 | 100,836 | 0.11 | 1 | 189 | 98.5 |
| 2 | 73,823 | 0.17 | 2 | 188 | 97.5 |
| 3 | 70,215 | 0.25 | 2 | 188 | 97.5 |
| 4 | 71,217 | 0.25 | 2 | 188 | 97.5 |
| 5 | 77,051 | 0.41 | 4 | 191 | 97.5 |
| 6 | 60,010 | 0.43 | 4 | 184 | 97.5 |
| 7 | 60,341 | 0.39 | 4 | 191 | 97.5 |
| 8 | 73,800 | 0.33 | 2 | 210 | 97.5 |
| 9 | 71,119 | 0.30 | 2 | 222 | 97.5 |
| 10 | 70,283 | 0.29 | 2 | 222 | 97.5 |
| 11 | 83,286 | 0.34 | 2 | 180 | 97.5 |
| 12 | 129,212 | 0.25 | 2 | 191 | 97.5 |
| 13 | 115,163 | 0.25 | 2 | 184 | 97.5 |
| 14 | 141,758 | 0.29 | 2 | 181 | 97.5 |
| 15 | 42,327 | 3.20 | 25 | 188 | 74.5 |
| 16 | 64,942 | 3.10 | 25 | 197 | 74.5 |

EXAMPLE 2

The procedure of Example 1 was followed, except that carbon monoxide was added to the feed in order to incorporate carbonyl groups along the backbone of the polymer. The runs were made at various temperatures. The composition and results of these runs are shown in Table 2 below. In all of the runs the pressure is 2007 kg/cm$^2$, the run time is 40 seconds, and the initiator is t-butyl peroxypivalate present at a concentration of 200 ppm.

TABLE 2

| Run | Molecular Weight | Mole % Ester in Product | Wt. % CO in Feed | Mole % Carbonyl in Product | Wt. % Dioxepane (MDOP) in Feed | Temp. °C. | Wt. % Ethylene in Feed |
|---|---|---|---|---|---|---|---|
| 17 | 63,464 | 0.31 | 1.0 | 6.1 | 2 | 183 | 96.5 |
| 18 | 53,579 | 0.16 | 1.0 | 8.3 | 2 | 184 | 96.5 |
| 19 | 55,240 | 0.35 | 1.0 | 8.8 | 2 | 188 | 96.5 |
| 20 | 52,547 | 0.10 | 1.0 | 5.4 | 1 | 194 | 97.5 |
| 21 | 49,498 | 0.09 | 1.0 | 5.2 | 1 | 191 | 97.5 |
| 22 | 55,493 | 0.10 | 1.0 | 7.6 | 1 | 191 | 97.5 |
| 23 | 25,428 | 0.70 | .25 | 1.6 | 10 | 188 | 89.3 |

What is claimed is:

1. A process for making a polymer comprising:

mixing ethylene with 2-methylene-1,3-dioxepane to form a reaction mixture;

heating the reaction mixture to about 150° to 260° C. at a pressure of about 350 kg/cm² to about 3500 kg/cm²; and reacting said mixture in the presence of a free radical initiator to form a polymer having a weight average molecular weight of at least about 7,000, said polymer having repeating units represented by the formula:

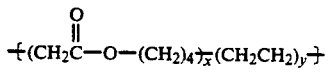

wherein x and y are integers.

2. The process of claim 1, wherein the weight average molecular weight is at least about 20,000.

3. The process of claim 1, wherein the weight average molecular weight is at least about 50,000.

4. The process of claim 1, wherein said polymer comprises about 0.05 to about 20 mole % ester groups.

5. The process of claim 1 wherein said polymer comprises about 0.05 to about 20 mole % ester groups and the weight average molecular weight is at least about 50,000.

6. A biodegradable polymer having an Mw of greater than 7000 made by the process of claim 1.

7. A biodegradable polymer having a weight average molecular weight of greater than 7,000 comprising repeating units represented by the formula:

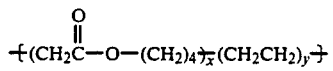

wherein x and y are integers.

* * * * *